United States Patent [19]

Kosarek

[11] Patent Number: 4,823,540

[45] Date of Patent: Apr. 25, 1989

[54] STRETCHABLE ONE-PIECE HOOD

[76] Inventor: Betty E. Kosarek, 4800 Frazier Dr., Hood River, Oreg. 97031

[21] Appl. No.: 50,787

[22] Filed: May 18, 1987

[51] Int. Cl.$^4$ .............................................. B68B 7/00
[52] U.S. Cl. ...................................................... 54/80
[58] Field of Search ................................ 54/79, 80, 81

[56] References Cited

U.S. PATENT DOCUMENTS

| | | | |
|---|---|---|---|
| 215,983 | 5/1879 | Simpson | 54/79 |
| 2,273,706 | 2/1942 | Hafner | 54/79 |
| 4,148,172 | 4/1979 | Fer | 54/80 |
| 4,355,600 | 10/1982 | Zielinski | 54/79 X |
| 4,452,247 | 6/1984 | Hebert | 128/402 |
| 4,480,429 | 11/1984 | Knox | 54/80 |
| 4,662,156 | 5/1987 | Oettel | 54/80 |

OTHER PUBLICATIONS

Verdict advertisement in Feb. 1987 edition of *The Lariat*.

Primary Examiner—Robert P. Swiatek
Attorney, Agent, or Firm—Klarquist, Sparkman, Campbell, Leigh & Whinston

[57] ABSTRACT

A hood shapes the main and protects and polishes the coat of a horse wearing it. The hood includes a single-walled, permeable, stretchable sleeve proportioned to cling tightly to the head and neck of a horse for training the mane and polishing the coat. The hood, which is preferably made of a clingable, stretchable material, such as polyester, has a head portion and a neck portion which are joined at a throat latch portion at an angle which is the normal angle at which a horse holds its head relative to the throat. Ear, eye, and muzzle openings expose the ears, eyes, and muzzle of the horse when the hood is worn.

7 Claims, 1 Drawing Sheet

U.S. Patent  Apr. 25, 1989  4,823,540
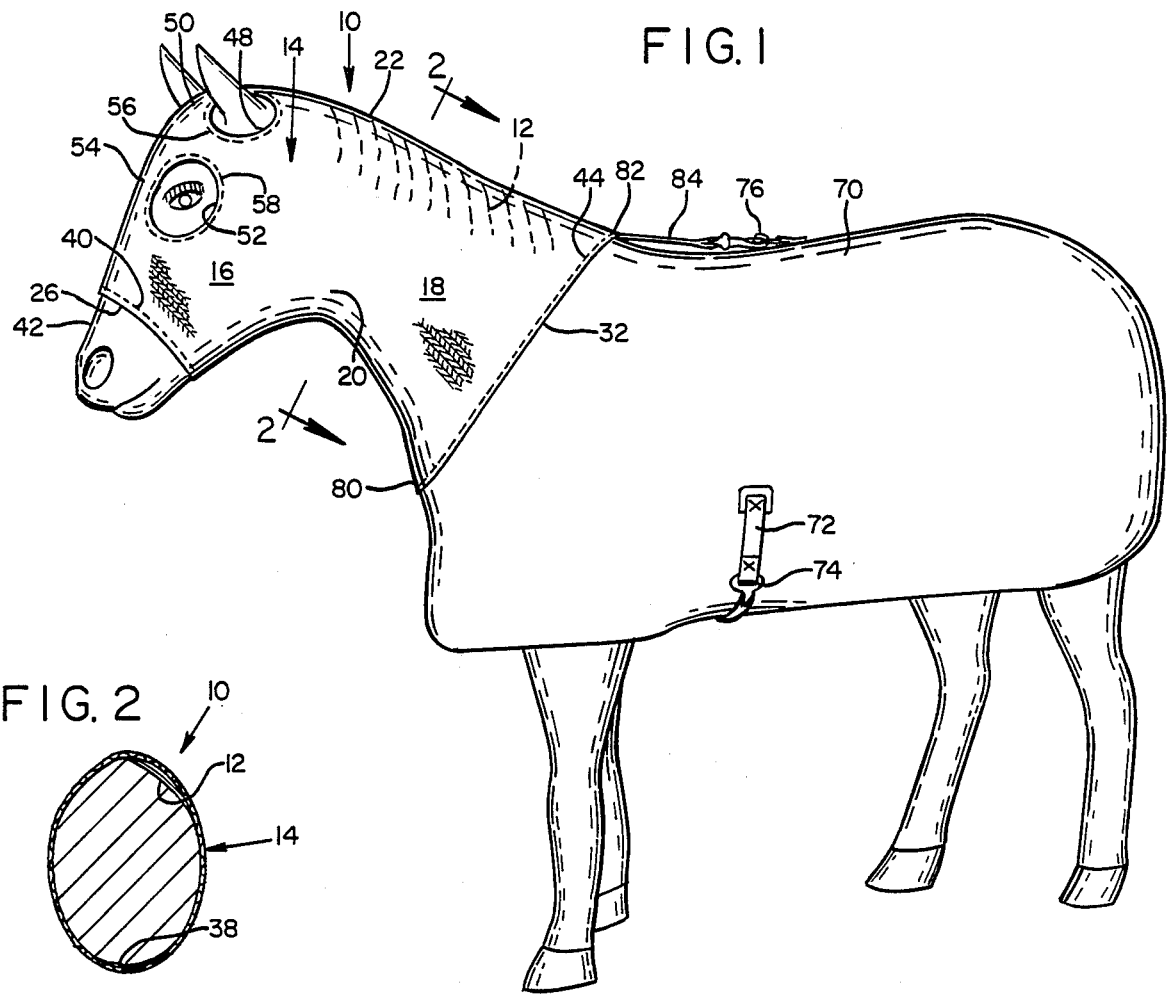
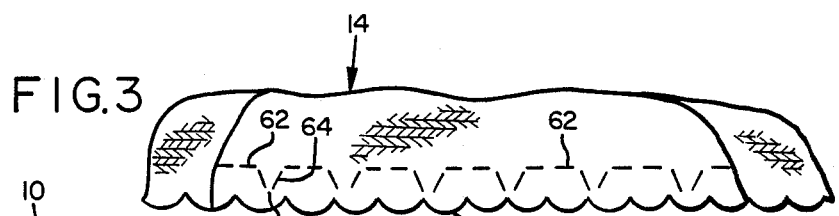
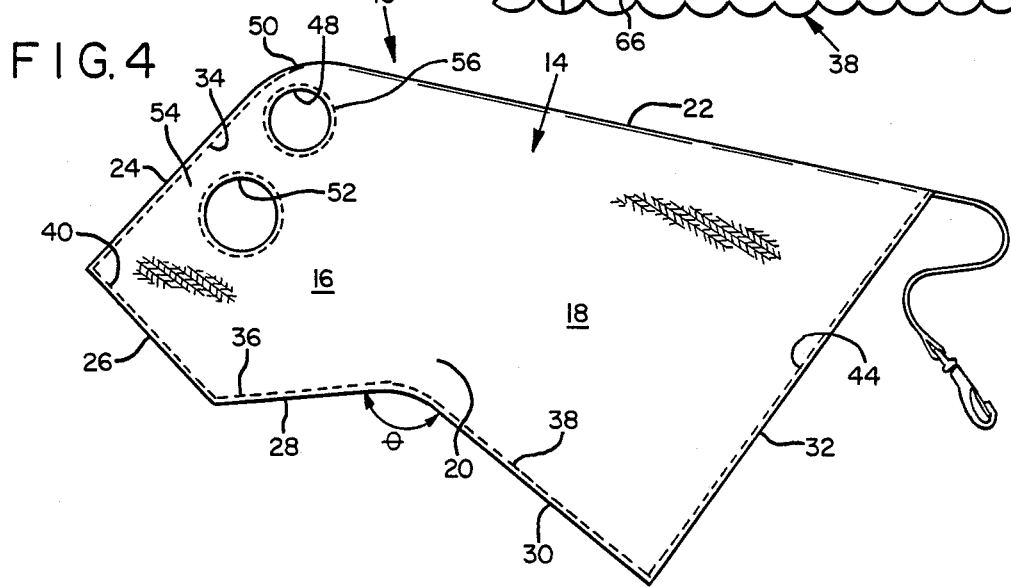

STRETCHABLE ONE-PIECE HOOD

BACKGROUND OF THE INVENTION

Field of the Invention

This invention relates to a hood for covering the head and neck of a horse.

General Discussion of the Background

Insulated blankets and hoods have long been used to protect horses from the adverse effects of cold weather. Such horse blankets and hoods have usually included a thick, insulated covering which is cut generally to conform to the shape of a horse's body and head. The heavy insulated material is placed around the body and head, then held in place with VELCRO straps, clips, or other fasteners. Such horse hoods are uncomfortable for the horse to wear because they are inflexible and impermeable. Air cannot readily move in and out of the blanket or hood, and the horse has to strain against the constraint of the hood to move its head. The hood is not cut to conform to the normal angle at which the horse holds its head.

A completely different kind of device is shown in U.S. Pat. No. 4,452,247 in which an impermeable, double-walled sleeve fits around a horse's head. Hot air is introduced into the sleeve and blown between the two impermeable walls of the sheet to heat the horse's neck and shape it. This shaping device is connected to an electric hot air blower which introduces the air into the sleeve. The horse's head must be tied in a fixed, raised position during treatment with the device. These restraints would make it impossible for a horse to wear such a device as a conventional horse hood.

Another problem with prior horse hoods is that they do not shape the mane of a horse wearing it. Moreover, the loose fit of most hoods does not polish the horse's coat. Finally, such horse hoods are cumbersome, difficult to attach to the horse, and uncomfortable to the horse wearing it.

It is accordingly an object of this invention to provide a hood which is comfortable to wear, easy to place on the horse, and shapes the mane and protects the coat of a horse wearing it.

Yet another object of the invention is to provide such a hood that polishes the horse's coat as the hood is worn.

Yet another object is to provide such a hood which allows the horse to move its head comfortably through a broad range of movement when the hood is worn.

Finally, it is an object to provide such a hood which protects the horse's coat from sun bleaching and is suitable for wearing in warm weather.

SUMMARY OF THE INVENTION

In the disclosed embodiment of the invention, a stretchable one-piece hood is provided which shapes a horse's mane while protecting and rubbing against the coat to polish it as the hood is worn. The hood includes a single-walled, permeable, stretchable sleeve proportioned to cling tightly to the horse's head and neck for holding down the mane and rubbing against the coat. The clinging action of the hood holds the mane in a desired direction to train it. The clinging hood also rubs against the coat to work lanolin and other oils out of the skin and into the coat to make it shiny.

In preferred embodiments, the hood includes a head covering portion and a neck covering portion which are joined at the throat latch at an angle which is a normal angle at which the horse holds its head relative to the throat. The horse wearing the hood is completely comfortable when holding its head at this normal position because the hood will not have to stretch at all. The stretchable material of which the hood is made, however, allows the horse's head great freedom of movement in all directions. Uninhibited motion of the horse's head is allowed, which permits the horse to perform comfortably such common acts as lowering its head to graze.

The hood is preferably a unitary sleeve having a stretchable seam which allows the hood to be pulled over the horse's head like a sock and placed in position. This construction eliminates the awkward necessity of providing VELCRO straps or metal fasteners along a seam to hold the hood in place. The eyes, ears, and muzzle of the horse are exposed through cutaway portions of the hood.

During cold weather, the hood of the present invention can be worn under a conventional heavy hood. In warmer weather, the hood alone is worn.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is a perspective view of a horse wearing a blanket and hood of the present invention.

FIG. 2 is a cross-sectional view taken along line 2—2 showing the relationship of the hood to the horse's mane.

FIG. 3 is an enlarged view of a seam which holds the hood together.

FIG. 4 is a plan view of the hood which is shown in its flattened condition when not being worn by the horse.

DETAILED DESCRIPTION OF A PREFERRED EMBODIMENT

A stretchable one-piece hood 10 is shown which is capable of shaping the mane 12 and protecting and polishing the coat of a horse. The hood includes a permeable, stretchable sleeve 14 which is proportioned to cling tightly to a head portion and a neck portion of a horse for holding down the mane 12 and rubbing against the coat to protect and shine it.

In the disclosed embodiment, sleeve 14 is made of a stretchable, permeable material, such as polyester, which has sufficient elastic memory to stretch and allow the sleeve to be pulled over a horse's head. The polyester material is especially preferred because it retains its shape even after repeated stretching during use.

Sleeve 14 includes a head covering portion 16 and a neck covering portion 18. The head and neck portions 16, 18 are joined at a throat latch covering portion 20 at an angle $\theta$ (FIG. 4). The angle $\theta$ is the normal angle of repose at which the horse holds its head relative to the throat. In the disclosed embodiment this angle is about 135°.

Sleeve 14 is cut in the pattern shown in FIG. 4 from a doubled over piece of polyester material. The pattern is cut from the material such that a doubled over fold 22 extends along the top of the hood in the area that will be placed over mane 12. Opposing forehead edges 24, jaw edges 28, and throat edges 30 are joined to each other along forehead seam 34, jaw seam 36, and throat seam 38 while opposing muzzle edges 26 and neck edges 32 are not joined to each other and remain open. A hem 40 is stitched along opposing muzzle edges 26 to circumscribe a muzzle opening through which the horse's muzzle 42 projects when hood 10 is being worn. A hem 44 is stitched along opposing neck edges 32 to circumscribe a neck opening which fits around the horse's neck during use of the hood.

A pair of circular ear openings 48 (FIGS. 1 and 4) are cut in hood 10 on both sides of a poll covering region 50 and a pair of circular eye openings 52 (only one is shown in the drawings) are cut in hood 10 on both sides of a forehead covering portion 54. A hem 56 surrounds each ear opening 48, and a hem 58 surrounds each eye opening 52 to provide a border for each opening that will not fray.

Seams 34, 36, 38, 40, and 44 are stretchable seams of the type shown in FIG. 3. The seam 38 along throat edge 30 is shown in FIG. 3 from the inside, hood 10 having been inverted. Seam 38 includes a baseline stitch 62 interrupted every two stitches by a pair of two stitches which form a triangular stitch 64 having an apex 66 which points into seam 38. This seam is capable of stretching with sleeve 14 because the apex 66 of triangular stitch 64 will move closer to baseline 62 as sleeve 14 stretches. When triangular stitch 64 flattens, the effective length of the stitched seam becomes greater. Once sleeve 14 is no longer stretched, the triangular stitch 64 returns to its prescribed shape.

Hood 10 is typically used in connection with a conventional blanket 70 which is secured in place around the body of the horse with the belly strap 72 and buckle 74. A D-ring is provided on a back covering portion of blanket 70.

In the disclosed embodiment, a wither strap 84 is sewed to hem 44 and extends rearwardly from the withers 82 to D-ring 76. Strap 84 is snapped to D-ring 76 to hold hood 10 in the desired position as shown in FIG. 1.

In use, the neck opening of sleeve 14 is pulled over the muzzle, ears, and mane of the horse until the neck opening is in place around the horse's neck, with the neck edge 32 extending from the point of the shoulder 80 to the withers 82 of the horse. The horse's ears are inserted through ear openings 48; the eyes are exposed through eye openings 52; and muzzle 42 protrudes through the muzzle openings circumscribed by hem 40. As sleeve 14 is pulled in place over the horse's head and neck, portions of the sleeve will be at least temporarily stretched. The polyester fabric and stretchable seams permit such temporary expansion, followed by contraction of the seams and material. Once sleeve 14 is in place around the horse's head and neck, as shown in FIG. 1, the polyester material clings tightly to the horse's coat and mane. Care should be taken to ensure that the mane 12 is laying in a desired direction under sleeve 14 such that the sleeve holds the mane firmly in place. The sleeve, as it is worn, will hold the mane in place and train it to lay in the desired direction. Frictional engagement between the clinging sleeve 14 and the area of the horse's coat on its head and neck covered by the sleeve rubs lanolin out of the horse's skin into the coat, which makes the coat shine.

Having illustrated and described the principles of the invention in a preferred embodiment, it should be apparent to those skilled in the art that the invention can be modified in arrangement and detail without departing from such principles. I claim all modifications coming within the spirit and scope of the following claims:

I claim:

1. A hood for shaping the mane and protecting and polishing a portion of a coat of a horse, comprising:
   an air permeable, stretchable unitary sleeve means capable of being stretched to fit over a horse's head while being pulled in place and yet proportioned to cling tightly to a head portion and neck portion of a horse for training the mane to lie in a predetermined direction and for rubbing against the coat with sufficient force to polish it;
   a pair of eye openings defined by the sleeve means for enabling the horse to see in all directions while wearing said sleeve means; and
   means attached to the sleeve means for connecting the sleeve means to a horse blanket mounted on the horse to allow the sleeve means to stretch to maintain its position relative to the horse's head as the horse lowers its head from its normal angle of repose.

2. The hood of claim 1 wherein the sleeve means is comprised of polyester.

3. The hood of claim 1 wherein the sleeve means includes a head covering portion and a neck covering portion joined at a throat latch covering portion at an angle which is a normal angle of repose for the horse's head relative to the throat.

4. The hood of claim 1 further comprising ear opening means for allowing the sleeve means to be worn without depressing the ears.

5. The hood of claim 4 further comprising eye opening means for allowing the horse to see when the hood is being worn.

6. The hood of claim 1 wherein the sleeve means is a unitary member having a stretchable seam.

7. A hood for shaping the mane and protecting and polishing a portion of the coat of a horse, comprising a permeable, stretching unitary sleeve means proportioned to cling tightly to a head portion and a neck portion of a horse for training the mane to lie in a predetermined direction and for rubbing against the coat with sufficient force to polish it, the sleeve means including a head covering portion and a neck covering portion joined at a throat latch covering portion at an angle which is a normal angle of repose for the horse's head relative to the throat, the sleeve means being a unitary member having a stretchable seam.

* * * * *

UNITED STATES PATENT AND TRADEMARK OFFICE
CERTIFICATE OF CORRECTION

PATENT NO.    : 4,823,540
DATED         : April 25, 1989
INVENTOR(S)   : Betty E. Kosarek It is certified that error appears in the above-identified patent and that said Letters Patent is hereby corrected as shown below:

In the abstract, first line, "main" should be --mane--.

Column 2, line 55, "stretching" should be --stretchings--.

Column 3, line 31, "prescribed" should be --prestressed-- and line 35, after "D-ring" insert --76--.

Column 4, line 49, "stretching" should be --stretchable--.

Signed and Sealed this

Twenty-seventh Day of March, 1990

Attest:

JEFFREY M. SAMUELS

*Attesting Officer*    Acting Commissioner of Patents and Trademarks